United States Patent
Yamazaki et al.

(10) Patent No.: US 7,640,864 B2
(45) Date of Patent: Jan. 5, 2010

(54) NON-MAGNETIC CONCRETE STRUCTURE, A SIDEWALL FOR A GUIDEWAY AND A METHOD FOR INSTALLING SUCH A SIDEWALL FOR THE GUIDEWAY

(75) Inventors: Mikio Yamazaki, Minato-ku (JP); Katsuhiro Tamura, Minato-ku (JP); Satoru Kato, Minato-ku (JP); Yukihisa Mine, Minato-ku (JP); Yoshihiro Tanaka, Shinjyuku-ku (JP); Akio Ohtake, Shinjyuku-ku (JP); Koichi Kanoh, Shinjyuku-ku (JP); Ariyoshi Makimoto, Shinjyuku-ku (JP)

(73) Assignees: Taisei Corporation, Tokyo (JP); Central Japan Railway Company, Aichi (JP)

( * ) Notice: Subject to any disclaimer, the term of this patent is extended or adjusted under 35 U.S.C. 154(b) by 780 days.

(21) Appl. No.: 10/569,634

(22) PCT Filed: Apr. 19, 2005

(86) PCT No.: PCT/JP2005/007422

§ 371 (c)(1),
(2), (4) Date: Feb. 27, 2006

(87) PCT Pub. No.: WO2006/051626

PCT Pub. Date: May 18, 2006

(65) Prior Publication Data

US 2007/0079732 A1    Apr. 12, 2007

(30) Foreign Application Priority Data

Nov. 10, 2004    (JP) .............................. 2004-325793

(51) Int. Cl.
*B60L 13/00*    (2006.01)

(52) U.S. Cl. ............... 104/286; 104/281; 104/282; 238/264

(58) Field of Classification Search ................. 104/281, 104/282, 283, 286; 238/264, 283, 382; 403/292, 403/294; 14/73.1

See application file for complete search history.

(56) References Cited

U.S. PATENT DOCUMENTS 2,197,786 A * 4/1940 Capouch ...................... 404/60

(Continued)

FOREIGN PATENT DOCUMENTS

EP    1 413 563 A1    4/2004

(Continued)

*Primary Examiner*—S. Joseph Morano
*Assistant Examiner*—Zachary Kuhfuss
(74) *Attorney, Agent, or Firm*—Oliff & Berridge, PLC

(57) ABSTRACT

A non-magnetic concrete structure having no magnetism or a very small magnetic permeability without reinforcing steel bars arranged, a sidewall for a guideway, and a method for installing the sidewall for the guideway are provided.

The reinforcing steel bars-free sidewall 11 for the guideway 10 is constructed by using a non-magnetic concrete structure constructed by using a fiber-reinforced cement-based mixed material and having no reinforcing steel bars therein. The fiber-reinforced cement-based mixed material is produced by mixing non-metallic fibers or non-magnetic metal fibers into a cement-based matrix in a mixing amount of 1 to 4% for an entire volume of the cement-based matrix. The cement-based matrix is obtained by mixing a composition with water. The above composition is composed of cement, aggregate grains having a maximum grain diameter of not more than 2.5 mm, pozzolanic reaction particles having particle diameters of not more than 15 μm and supper plasticizer. The fiber-reinforced cement-based mixed material has mechanical properties: a compressive strength of not less than 150 N/mm² and a tensile strength of not less than 5 N/mm².

9 Claims, 9 Drawing Sheets

U.S. PATENT DOCUMENTS

| | | | |
|---|---|---|---|
| 5,674,028 A * | 10/1997 | Norin | 404/74 |
| 6,357,359 B1 * | 3/2002 | Davey et al. | 104/282 |
| 6,517,277 B2 * | 2/2003 | Hu et al. | 403/294 |
| 2003/0177938 A1 * | 9/2003 | Reichel et al. | 104/282 |
| 2004/0247846 A1 | 12/2004 | Uzawa et al. | |
| 2005/0166786 A1 * | 8/2005 | Reichel et al. | 104/124 |

FOREIGN PATENT DOCUMENTS

| | | |
|---|---|---|
| JP | A 63-272841 | 10/1988 |
| JP | A 05-272102 | 10/1993 |
| JP | A 8-144513 | 6/1996 |
| JP | A 10-212553 | 8/1998 |
| JP | A 2000-134721 | 5/2000 |
| JP | A 2001-240451 | 9/2001 |
| JP | A 2002-348167 | 12/2002 |
| JP | A 2004-256055 | 9/2004 |
| WO | WO 02/96826 | 5/2002 |
| WO | WO 02/096825 A1 | 12/2002 |

* cited by examiner

NON-MAGNETIC CONCRETE STRUCTURE, A SIDEWALL FOR A GUIDEWAY AND A METHOD FOR INSTALLING SUCH A SIDEWALL FOR THE GUIDEWAY

TECHNICAL FIELD

The present invention relates to a non-magnetic concrete structure to be constructed at a place where a non-magnetic material is desired to be used, such as a guideway for the superconducting Magnetically Levitated Vehicle (Maglev), a compass checking apron in an airport, a nuclear fusion experimental reactor, an electrolytic refining furnace or the like. The invention also relates to a sidewall for a guideway attached with ground coils for propulsion, levitation and guidance for a superconducting Maglev, and a method for installing the sidewall for the guideway.

BACKGROUND ART

A guideway 2 as shown in FIG. 9 is conventionally known, on which a superconducting Maglev 1 is run in a superconducting Magler system (See Patent Literature 1).

During low-speed running, supporting wheels 1b, 1b are projected from the lower face of the superconducting Maglev 1, and run on wheel-running paths 5, 5, respectively. On the other hand, during high-speed running, the vehicle is levitated and driven forward through magnetic interaction between superconductive magnets 1a, 1a provided at opposite side faces of the vehicle and ground coils 3a, 3a provided on opposite sidewalls 3, 3 of the guideway 2, respectively.

Although the sidewall 3 is constructed by reinforced concrete, there is a problem that if the sidewalls 3 have high magnetism, magnetic resistance increases and electric power consumption necessary for running rises.

Under circumstances, non-magnetic metals are used for the reinforcing bars for use in constructing the sidewall 3. Although austenitic stainless steel and high-Mn steel are known as the non-magnetic metals having low magnetic permeability, the stainless steel has such defects when used as the reinforcing bar that stainless steel is expensive, non-magnetic characteristic is largely deteriorated in working and its yield strength is low (See Patent Literature 2).

To the contrary, the reinforcing bar made of the high-Mn steel exhibits high strength and stable non-magnetic characteristic, and is less expensive than the stainless steel, the high-Mn steel has been used for the non-magnetic reinforcing bars 6.

On the other hand, there occur problems that if a gap between the 3a and the superconducting magnet 1a is wide, propulsion force decreases and the electric power consumption increases, whereas if it is narrow, the ground coil may contact the magnet, construction and management are required to be done at high accuracy (See Patent Document 3).

Patent Document 1: JP-A 2000-134721 (FIGS. 3 and 4)
Patent Document 2: JP-A 10-212553 (Paragraphs 0001 to 0004)
Patent Document 3: JP-A 8-144513 (Paragraphs 0004 to 0005)

DISCLOSURE OF THE INVENTION

Problems to be Solved by the Invention

However, the above non-magnetic reinforcing bar 6 has low magnetic permeability, but this magnetic permeability is still around 1.0. Thus, if such non-magnetic reinforcing bars are arranged near an inner side face of the sidewall 3, they cause the magnetic resistance to increase to no small extent. Consequently, the electric power consumption necessary for running unfavorably increases.

Under the circumstances, the present invention is aimed at providing a non-magnetic concrete structure having no magnetism or every small magnetic permeability and containing no reinforcing steel bars, a sidewall for a guideway and a method for installing such a sidewall for the guideway.

Countermeasure for Solving the Problems

In order to realize the above object, the present invention is directed to a non-magnetic concrete structure constructed by using a fiber-reinforced cement-based mixed material and having no reinforcing steel bars therein, said fiber-reinforced cement-based mixed material being produced by mixing non-metallic fibers or non-magnetic metal fibers into a cement-based matrix in a mixing amount of 1 to 4% for an entire volume of the cement-based matrix, said cement-based matrix being obtained by mixing a composition with water, said composition comprising cement, aggregate grains having a maximum grain diameter of not more than 2.5 mm, pozzolanic reaction particles having particle diameters of not more than 15 μm and supper plasticizer, said fiber-reinforced cement-based mixed material having mechanical properties: a compressive strength of not less than 150 N/mm$^2$ and a tensile strength of not less than 5 N/mm$^2$.

The above invention may be characterized in that prestressing force is introduced by non-metallic prestressing cables or non-magnetic metallic members passed through the structure.

The present invention is directed to a sidewall for a guideway constructed as said non-magnetic concrete structure, said sidewall for the guideway being to be attached with a ground coil for propulsion of a superconducting Maglev, said sidewall comprising a beam portion, a plane-shaped support base seat, a wall portion to which the ground coil is to be attached, and reinforcing ribs which are arranged at an interval in said extending direction, said beam portion and said support base seat being extended in an extending direction of the guideway and vertically spaced from each other, said beam portion and said support base seat being connected by said wall, a back face of the wall portion and an upper face of the support base seat being connected by the reinforcing ribs.

Further, the present invention is directed to a method for installing the above-mentioned sidewall for the guideway on a floor slab, said method comprising interposing a position-adjusting mat between said floor slab and said support base seat, said position-adjusting mat being adapted to be inflated by filling a filler therein, adjusting a location of said sidewall by filling the filler into the position-adjusting mat, and fixing the support base seat to the floor slab after the filler is cured.

The above installing method may be characterized in that when sidewalls are to be connected in the extending direction of the guideway, while a gap is ensured between the adjacent sidewalls, said method comprising forming connecting holes in said reinforcing ribs arranged at end faces of the sidewalls, respectively, such that each of the connecting hole passes the reinforcing rib in the extending direction, inserting connecting member through the connecting holes, said connecting member being provided with two outer tubes made of a non-magnetic metal and slidable along a central shaft portion thereof, bringing the slidable direction substantially in conformity with the extending direction, filling a joining agent between the outer tubes and the connecting hoes, and fixing the outer tubes to the connecting holes, respectively.

Effects of The Invention

According to the thus constructed invention, the structure is constructed by use of the high-strength, fiber-reinforced cement-based mixed material having no magnetism or very small magnetic permeability and employing non-magnetic metallic fibers or non-magnetic metallic fibers without use of reinforcing steel bars.

Therefore, the non-magnetic concrete structure having no magnetism or very small magnetic permeability can be formed.

Further, the structure can be constructed by introducing prestressing force with the non-metallic prestressing member or the non-magnetic metal prestressing member.

Thus, cracking resistance or ultimate bearing capacity of the non-magnetic concrete structure can be enhanced. Thereby, the thickness of the structure can be made extremely thin, so that the weight can be largely reduced.

Accordingly, the above non-magnetic concrete structure can be formed as a sidewall of the guideway in which a superconducting Maglev is to be run. Further, since a load can be distributed over the extending direction with the beam portion, the sectional area of the sidewall can be reduced.

Consequently, the magnetic permeability of the sidewall which is desired to be a structure having low magnetic permeability can be reduced, and the electric power consumption necessary for running the superconducting Maglev.

Since the sectional area of the sidewall can be largely decreased owing to its structural property, the weight can be largely reduced. When the weight of the sidewall can be largely reduced like this, sizes of structural bodies located under it, such as a floor slab, a bridge pier, a foundation, etc. can be also miniaturized to reduce the entire construction cost to a large extent.

Further, according to the guideway-installing method of the present invention, the position-adjusting mat is interposed between the sidewall-installing floor slab and the support base seat, and the position of the sidewall is adjusted by introducing the filler under pressure.

Owing to this, the sidewall can be easily installed to meet a positional control at a high precision of an order of 1 mm.

In the present invention, after the connecting member is inserted through the connecting holes formed in the reinforcing ribs and the sliding direction is almost in coincidence with the extending direction, the outer pipes can be fixed to the connecting hole.

Thus, the connecting portion capable of coping with changes in temperature can be easily constructed. In addition, the sidewall of the guideway installed according to the above method can transmit a load onto the adjacent sidewall via the connecting member, the end portion of each sidewall can ensure the same sectional rigidity and load resistance performance as in the central portion and maintain continuity between the sidewalls can be maintained.

Figure 1:
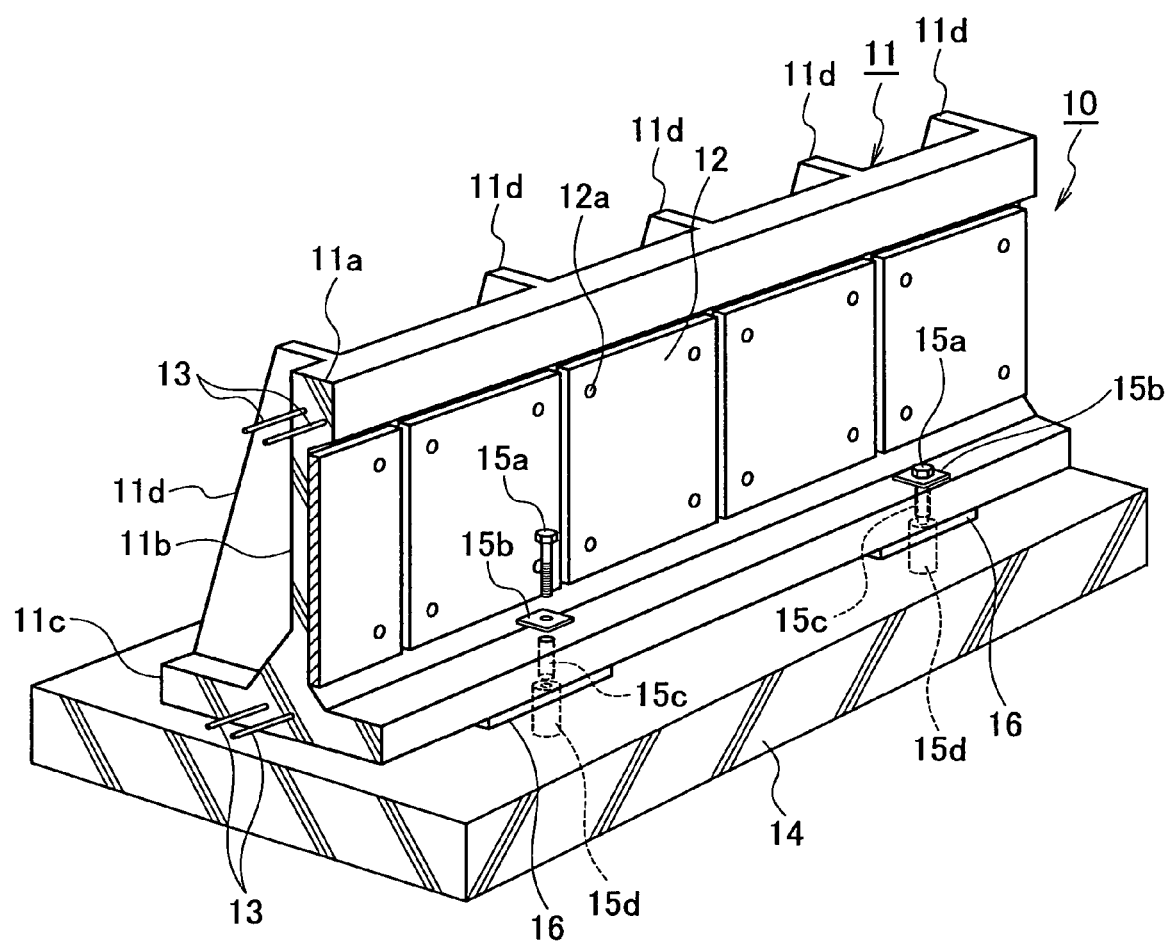
FIG. 1 is a perspective view illustrating the construction of a sidewall of a guideway as a preferred embodiment of the present invention.

| Explanation of reference numerals | | | |
|---|---|---|---|
| 1 | superconducting Maglev | 10 | guideway |
| 11 | sidewall | 11a | beam portion |
| 11b | wall portion | 11c | support base seat |
| 11d | reinforcing rib portion | 11e | connecting hole |
| 12 | ground coil | 13 | non-metallic prestressing member |
| 14 | floor slab | 16 | position-adjusting mat |
| 17 | filler | 18 | connecting member |
| 18a | central shaft portion | 18b | outer pipe |
| 19 | connecting member | | |

BEST MODES FOR CARRYING OUT THE INVENTION

In the following, the best mode for carrying out the invention will be explained with reference to the drawings.

Explanation will be made, while same reference numerals are given to portions identical or equivalent to those in the conventional example.

Figure 2:
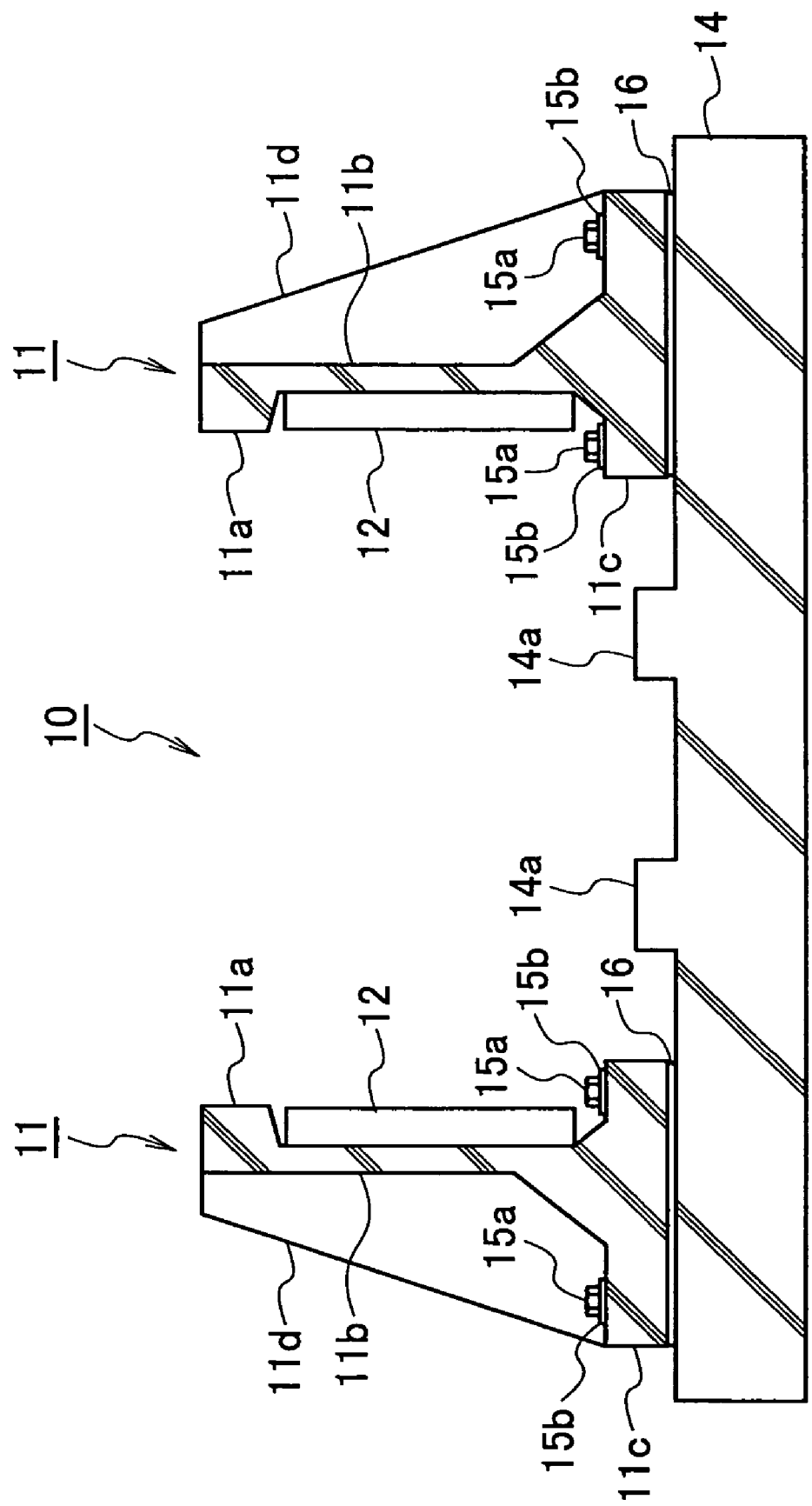
FIG. 2 is a sectional view of the guideway constructed according to the best embodiment of the present invention.

FIGS. 1 and 2 are views showing the construction of a sidewall 11 of a guideway 10 as a non-magnetic concrete structure according to this embodiment.

First referring to FIG. 2, the entire construction of the guideway 10 of the present embodiment will be explained.

The guideway 10 in which a superconducting Maglev 1 (not shown) is to run is constructed by floor slabs 14 and sidewalls 11, 11 opposed to each other at a constant space on the floor slabs. As to a bridge, such floor slabs 14 are placed on bridge beams of the bridge. As to an earth fill or a tunnel, such floor slabs 14 are placed on a supporting road.

Wheel-running paths 14a and 14a to be used at low-speed running are provided in parallel in an extending direction on floor slabs 14.

In this embodiment, the sidewalls 11 are arranged in the extending direction of the guideway 10, and ground coils 12 to be used for levitation and propulsion of the superconducting Maglev 1 are attached.

Further, in order to reduce the magnetic resistance in running the superconducting Maglev 1, the sidewall 11 is desirably a structure having an extremely low magnetic permeability or no magnetism. Thus, according to the present embodiment, the sidewall 11 is formed by using a fiber-reinforced cement-based mixed material given below, without use of reinforcing steel bars.

This fiber-reinforced cement-based mixed material is produced by producing a cement-based matrix through a composition containing cement, aggregate grains, pozzolanic reaction particles, supper plasticizer and water and then mixing non-metallic fibers or non-magnetic metallic fibers into the thus produced cement-based matrix.

As the aggregate grains, an aggregate material having the maximum grain size diameter of not more than 2.5 mm, preferably not more than 2 mm is used. As to the pozzolanic reaction particles, those having grain size diameters of not more than 15 µm are used. For example, as highly active pozzolanic reaction particles having particle diameters of 0.01 to 0.5 µm, silica fume or the like is used. On the other hand, as to less active pozzolanic reaction particles having particle diameters of 0.1 to 15 µm, fly ash, blast-furnace slag or the like is used. These pozzolanic reaction particles having different activities may be mixed or each of them may be singly used. Further, at least one kind of the supper plasticizer is used for enhancing fluid-like flowing property.

As the non-metallic fibers or non-magnetic metal fibers, materials having diameters of about 0.05 to about 0.3 mm and lengths of about 8 to about 16 mm are used, for example. As such non-metallic fibers, vinylon fibers, carbon fibers, glass fibers, polypropylene fibers or the like are used. As the non-magnetic metallic fibers, stainless fibers or the like are used.

Such non-metallic fibers or non-magnetic metallic fibers are mixed in an amount of around 1 to around 4% of the entire volume of the fiber-reinforced cement-based mixed material produced above. This fiber-reinforced cement-based mixed material produced to have the above composition becomes a material exhibiting compressive strength of at least 150 N/mm$^2$ and tensile strength of not less than 5 N/mm$^2$.

With respect to a test sample (4 cm×4 cm×16 cm), the mixed material is a material which exhibits a ductile property: bending tensile strength of not less than 20 N/mm$^2$ and excellent ductility that a fracture energy in bending fracture is 200 to 300 times as large as that of the conventional concrete.

Since the mixed material has such properties, the structure can be constructed without steel bar reinforcement as in the conventional reinforced concrete.

Since this fiber-reinforced cement-based mixed material has a very small water/cement ratio of less than 0.24 with a dense structure, chloride iron diffusion coefficient and water permeability coefficient are smaller than those in the conventional concrete by an order of 2 digits. Consequently, the fiber-reinforced cement-based mixed material is completely free from deterioration due to carbonation or freezing-thawing, so that its non-deteriorated time period can be considered as an order of 100 year.

Further, since the above fiber-reinforced cement-based mixed material has the low water/cement ratio but high flow property (a flow value of 240 mm to 260 mm in a mortar flow test), minute and complicated shapes can be formed at high precision without using a vibrator.

When the fire-reinforced cement-based mixed material is subjected to primary curing (20 to 25° C. for 24 to 30 hours) and then cured with steam (90° C. for 48 hours), the material exhibits 100% strength. Further, since the material is completely free from deformation due to shrinkage in drying after the curing, the material has the property that no cracking occurs due to shrinkage in drying.

The sidewall 11 produced from the fiber-reinforced cement-based mixed material is constituted by a beam portion 11a extending in an extending direction of the guideway 10, a support base seat 11c extended in the same direction as the beam portion 11a while being vertically spaced from the beam portion 11a, a wall portion 11b connecting the beam portion 11a with the support base seat 11c, and reinforcing rib 11d bridging a back face of the wall portion 11b and an upper face of the support base seat 11c, while the material is not reinforced with steel bar reinforcement.

The beam portion 11a is a member functioning to distribute, in the extending direction, a load occurring in running the superconducting Maglev 1 or the like. The beam portion 11a is an long shaped member having an almost rectangular sectional shape, and prestressing force is introduced into the beam portion by means of non-metallic prestressing members 13, 13 (or non-magnetic metallic prestressing members) passed through it in the longitudinal direction thereof.

When the prestressing force is introduced like this, a deformed amount in the final state can be reduced, and the withstandable load can be increased.

As the non-metallic prestressing member 13, a prestressing member made of a non-metallic material, such as a carbon fiber prestressing material, a glass fiber prestressing material, an aramide fiber prestressing material or the like is used. As the non-magnetic metallic prestressing member, a prestressing member made of a non-magnetic metal, such as authentic stainless steel prestressing member is used.

The support base seat 11c is a member to resist falling of the sidewall 11 and fixing the sidewall 11 to the floor slab 14. The support base seat 11c is designed in a planar shape having a rectangular form as viewed in plane, and the prestressing force is introduced with the non-metallic prestressing members 13, 13 passed therethrough in the longitudinal direction.

The support base seat 11c is provided with a plurality of through-holes 15c through which non-magnetic bolts 15a are to pass for fixing the support base seat 11c to the floor slab 14. The through-hole 15c is a cylindrical hole having an elliptical or oval shape as viewed in plane and passed through the support base seat 11c in a thickness direction thereof.

The wall portion 11b is a member connecting the beam portion 11a with the support base seat 11c. The wall portion 11b is erected on the support base seat 11c. A connecting portion between the wall portion 11b and the support base seat 11c is provided with a haunch having an almost triangular section for preventing stress concentration.

The thickness of the wall portion 11b can be reduced to around ¼ of that of the sidewall made of the conventional reinforced concrete by forming the wall portion 11b of the above fiber-reinforced cement-based mixed material.

The beam portion 11a is formed such that its part projects inwardly of the guideway 10 from the upper end of the wall portion 11b. The coil 12 formed in a panel shape is attached to that inner side face of the wall portion 11b by means of fitting bolts 12a.

The reinforcing rib 11d is a member connecting a back face of the wall portion 11b with an upper face of the supporting base seat 11c, and is arranged at opposite ends and intermediate portions of the wall portion 11 at a given interval as viewed in the extending direction.

Figure 3:
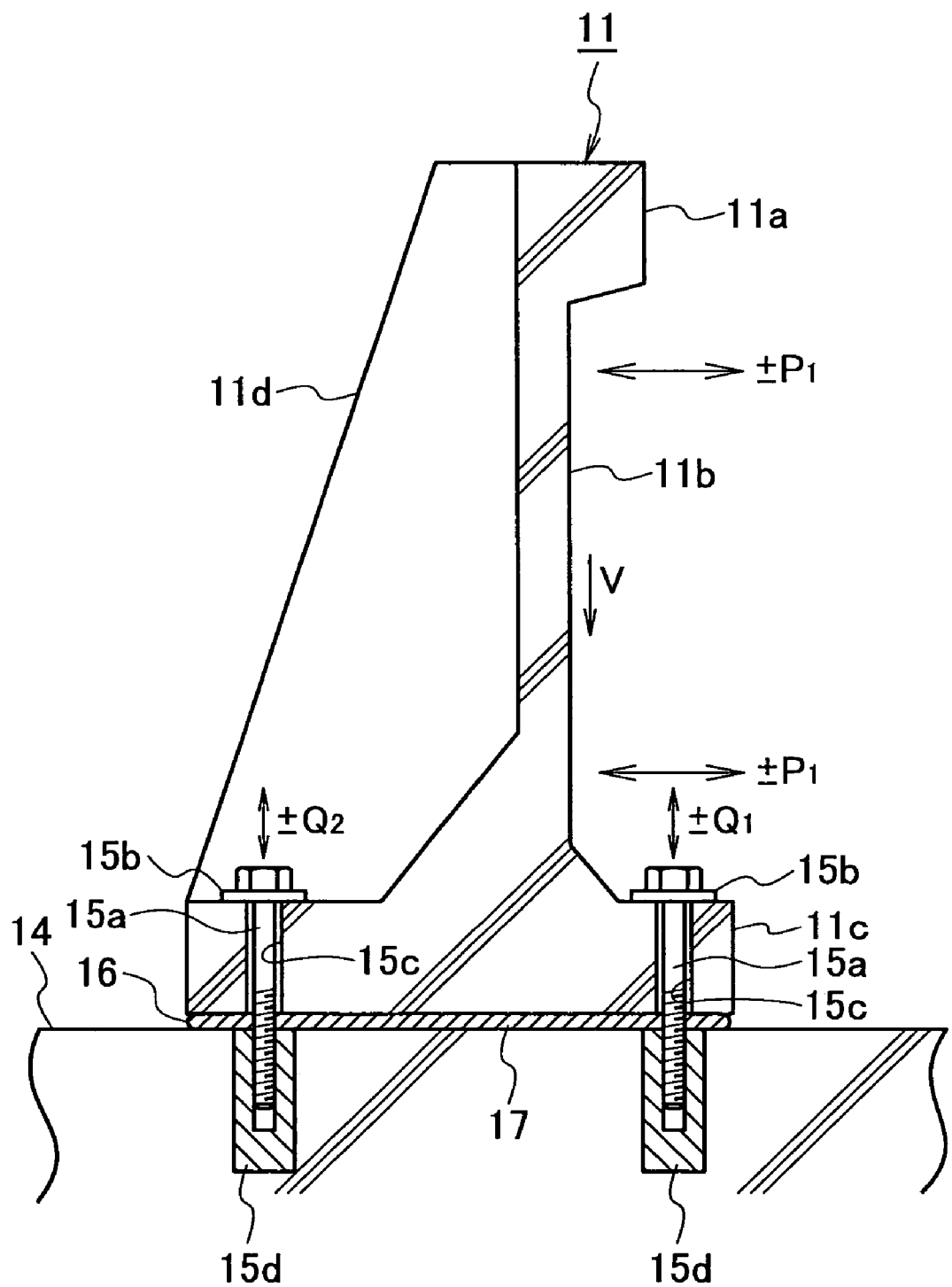
FIG. 3 is a sectional view showing a reaction force generated when a load is applied to the sidewall when a superconducting Maglev runs.

As shown in FIG. 3, the reinforcing rib 11d is a planar member having a trapezoidal sectional shape as viewed in plane with its peripheral end face being fixed to the back face of the wall portion 11b and the upper face of the support base seat 11c. The reinforcing rib portion 11d is erected such that it is almost orthogonal to the faces of the wall portion 11b and the support base seat 11c, respectively.

Further, a position-adjusting mat 16 in this embodiment is a cloth bag formed in a bag-shaped shape. The mat is expanded by filling a filler 17 thereinto so as to positionally adjust the sidewall 11 placed on the mat.

As the filler, a mortar-like material obtained by mixing cement as a main component, pozzalanic powder or fine sand, supper plasticizer and water. The filler 17 is converted to a non-shrinkable material having no self-shrinkability or no shrinkability in drying by mixing an expanding agent into the filler 17.

Further, a curing accelerator may be mixed to promote development of strength after curing.

The filler 17 may be imparted with viscoelasticity by adding an asphalt emulsion or a rubbery polymer into the mortar material containing the cement as the main component, so that vibration of the sidewalls 11, 11 can be suppressed when the superconducting Maglev 1 runs. Further, when the non-metallic fibers or non-magnetic metallic fibers having diameters of 0.01 to 0.2 mm and lengths of 3 to 16 mm are added to the above composition of the filler 17 in an amount of around 0.5 to around 3% of the entire volume, the filler can be converted to a material which can resist repeated loads and local tensile loads applied during the running of the superconducting Maglev 1.

Further, in this embodiment, the non-magnetic bolt 15a for fixing the sidewall 11 to the floor slab 14 is a bolt made of a non-magnetic metal such as stainless steel and having thread grooves engraved in one end thereof.

Into the floor slab 14 are buried insert nuts 15d at positions opposed to the through-holes 15c when the side wall 11 is installed. The insert nut 15d is provided with screw grooves.

The sidewalls 11 are produced as precast members each having a unit length in a factory or the like, and carried to and installed in a construction site. Thus, the connection portions are formed between the sidewalls 11, 11.

Figure 6:
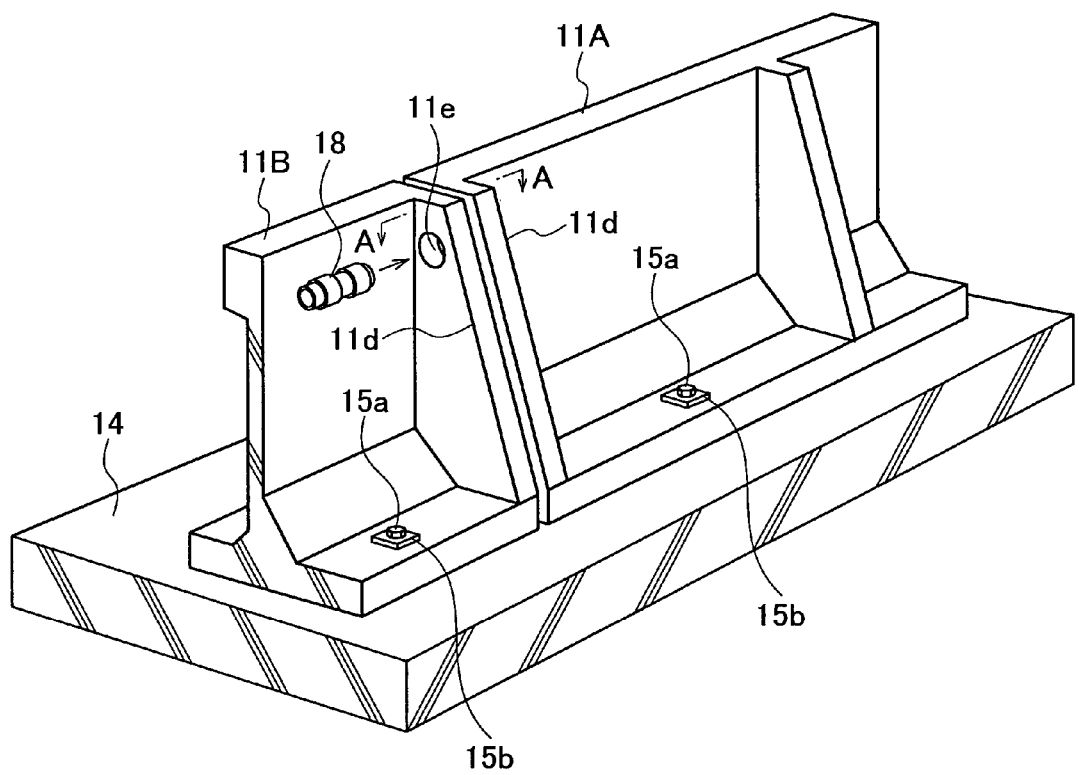
FIG. 6 is a perspective view of a connecting portion between adjacent sidewalls.

A connecting member 18 to be arranged at the connecting portion is constituted by a central shaft portion 18a and two outer pipes 18b, 18b slidable along the shaft portion 18a (See FIGS. 6 and 7). The central shaft portion 18a is constituted by a shear member 18d resisting shearing force and an inner tube 18c covering the outer face of the shear member.

The shear member 18d is a cylindrically shaped member made of the above-mentioned fiber-reinforced cement-based mixed material, and is produced by charging this mixed material inside the non-metallic metal inner tube 18c. Therefore, the inner tube 18c and the shear member 18d are integrated as the central shaft portion 18a.

The central shaft portion 18a is inserted through outer tubes 18b, 18b each having an inner diameter almost identical with the outer diameter of the inner tube 18c. Even if there is a gap of 1 mm or less, for example, between the outer peripheral face of the inner tube 18c and the inner peripheral face of the outer tube 18b, the outer tubes 18b can be slid along the central shaft portion 18a.

In addition, since the outer tubes 18b and the inner tube 18c are similarly made of the non-magnetic metal, magnetic resistance cannot be increased by the connecting member 18.

Next, a method for installing the above sidewall 11 as well as the function of this embodiment will be explained.

Steps of a procedure for installing the sidewall 11 are shown in FIG. 5. Although omitted in FIG. 5, the ground coil 12 is attached to the sidewall portion 11b by means of the fitting bolts 12a before the sidewall 11 is installed on the floor slab 14.

Figure 5A:
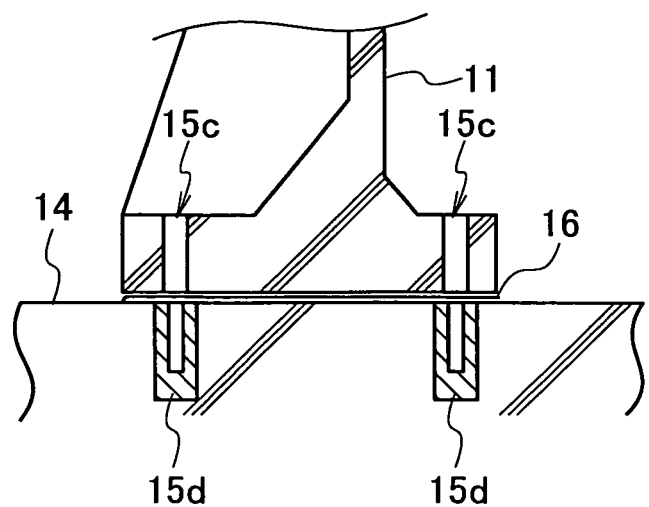
FIG. 5 is a working procedure chart showing a method for installing the side way for the guideway.

First, as shown in FIG. 5(a), the empty position-adjusting mat 16 is placed on the upper face of the floor slab 14, and then the sidewall 11 is placed on the mat. At this time, the sidewall 11 is placed such that a continuous hole may be formed between the through-hole 15c of the sidewall 11 and the insert nut 15d buried in the floor slab 14.

When the position-adjusting mat 16 is also positioned between the through-holes 15c and the insert nuts 15d, the position-adjusting mat having holes at corresponding portions is used. The holes are so formed that the filler 17 filled inside the mat may not leak through the holes.

Figure 5B:
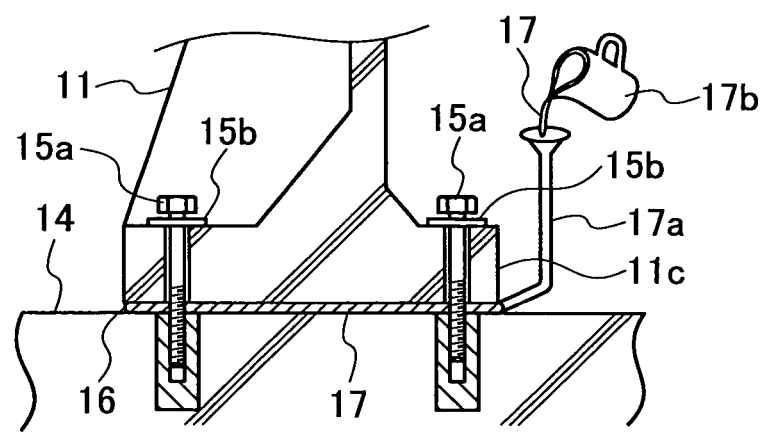

As shown in FIG. 5(b), a pressure-bearing plate 15b is placed at a hole opening of the through-hole 15c, and the non-magnetic bolt 15a is inserted into the through-hole 15c and the insert nut 15d.

The non-magnetic bolt 15a is screwed into the screw grooves of the insert nut 15d such that the former may stand upright by itself. At this time, a gap is retained between the lower face of a screw head of the non-magnetic bolt 15a and the upper face of the pressure-bearing plate 15b, so that the support base seat 11c may be raised by this gap.

Since the position-adjusting mat 16 adjusts a height level by about 2 to about 6 cm, the gap corresponding to this may be retain between the lower face of the screw head and the upper face of the pressure-bearing plate 15b.

The sidewall is located in this state according to a high-precision three-dimensional surveying technique, and the sidewall 11 is tentatively fixed to the floor slab 14 by means of the non-magnetic bolt 15a or another means. After the sidewall 11 is tentatively fixed in this way, the filler 17 is charged into the position-adjusting mat 16. When the filler 17 is charged under a pressure of about 10 to about 20 kPa, the position-adjusting mat 16 can be closely contacted with the upper face of the floor slab 14 and the lower face of the support base seat 11c, while fitting to uneven portions of these faces.

A method for pouring the filler 17 under pressure, for example, a filling opening for a filler tube 17a is positioned to a higher position, and the filler is poured through the filing opening from a vessel 17b to apply a pressure head corresponding to the above higher position.

Height or inclination is adjusted by expanding the position-adjusting mat 16, thereby adjusting the sidewall 11 to a precise position.

Figure 5C:
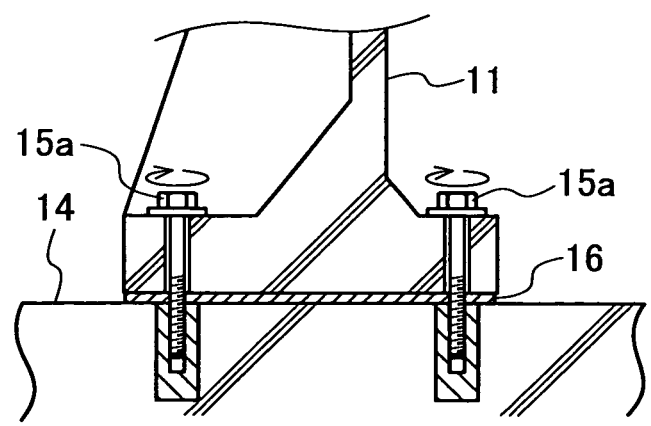

Further, after the filler 17 is cured and preset strength is exhibited, as shown in FIG. 5(c), the sidewall 11 is fixed to the floor slab 14 by tightening the non-magnetic bolt 15a under a specified control of torque.

Since the sidewall 11 is installed such that the position of the sidewall 11 is positionally controlled at high precision by means of the position-adjusting mat 16, a gap between the running superconducting Maglev 1 and the ground coil 12 can be always kept constant.

Owing to this, it is possible to prevent the phenomenon that the electric power consumption will increase as the superconducting Maglev is spaced too largely from the ground coil or that the superconducting Maglev 1 or the ground coil 12 will be damaged as they approach too closely to each other. Further, since the positioning can be controlled easily at a high precision, construction workability is excellent.

FIG. 3 shows loads P1 and V acting upon the sidewall 11 and reaction forces Q1 and Q2 caused thereby, when the superconducting Maglev 1 runs.

The horizontal load P1 means alternate loads repeatedly applied to the sidewall 11 in inner/outer face directions thereof when the superconducting Maglev 1 passes. The vertical load V is a load acting in the vertical direction when the superconducting Maglev 1 passes.

These loads P1 and V cause the non-magnetic bolts 15a, 15a arranged on inner and outer sides of the sidewall 11, respectively to generate alternate reaction forces Q1 and Q2 pushing or pulling in the vertical directions.

Figure 4:
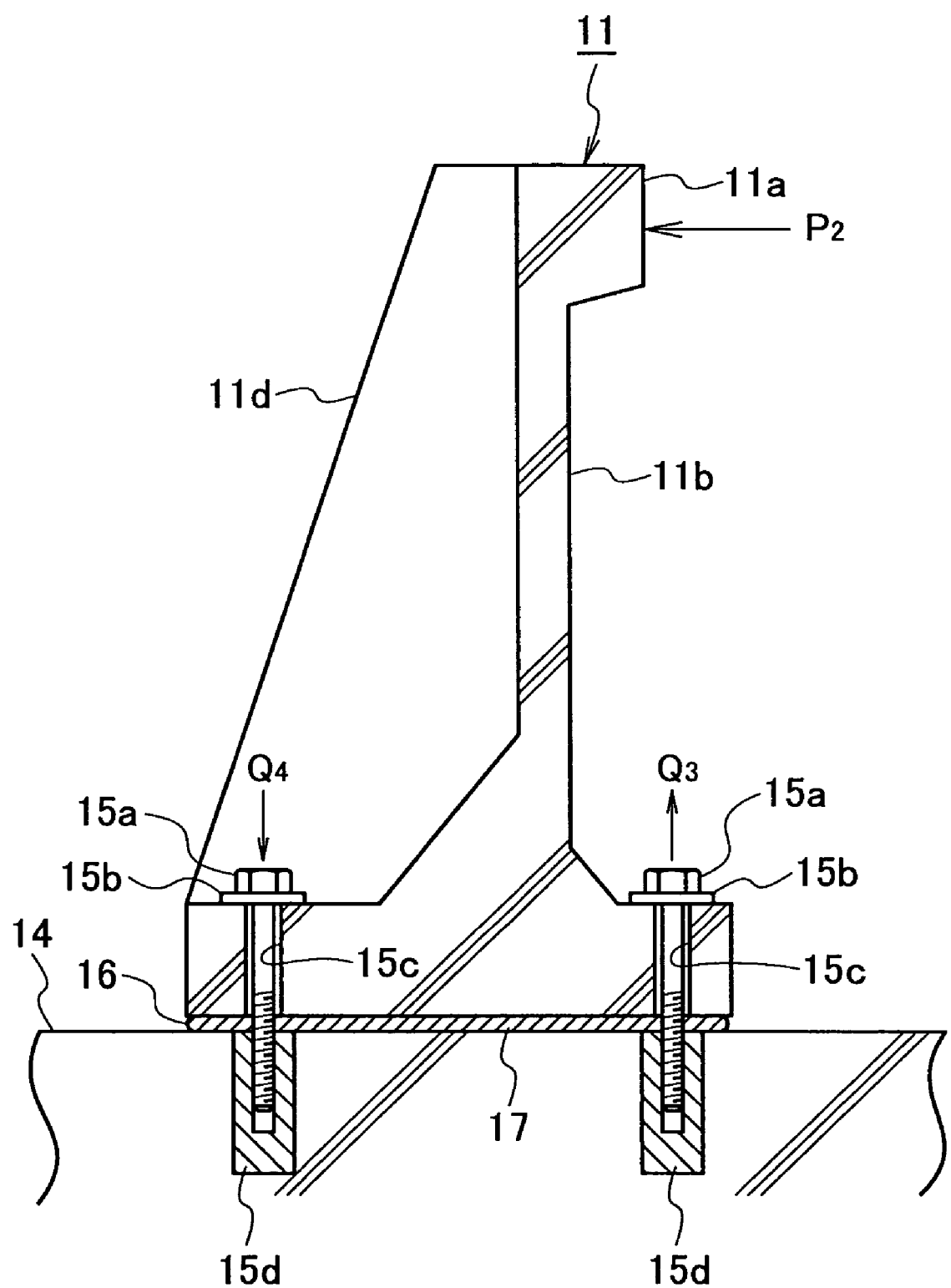
FIG. 4 is a sectional view showing a reaction force generated when a load is applied to the guideway in emergency.

FIG. 4 shows a load P2 occurring on the sidewall 11 as well as reaction forces Q3 and Q4 caused by the load P2, in emergency when this abnormality is caused in the superconductive magnet of the superconducting Maglev 1.

In this embodiment, since the beam portion 11a is longwise provided for the sidewall 11, the sidewall can resist the load P2 in emergency, and can always distributes the load P1 and V in the extending direction.

The load acting upon the beam portion 11a is transmitted to the support base seat 11c and the reinforcing rib portions 11d by the wall portion 11b.

Further, the support base seat 11c can prevent the sidewall 11 from falling with the horizontal loads P1 or P2, whereas the reinforcing rib portions 11d can resist the load which could not be borne by a corner portion at which the wall portion 11b and the support base seat 11c intersect with each other, and a bending deformation amount of the wall portion 11b or the beam portion 11a can be suppressed to a preset value or less.

In the above, the method for installing each of the respective sidewalls 11 and its function. In the following, the connecting portions between the sidewall 11A and 11B will be explained with reference to FIG. 6 to FIG. 8.

The connecting member 18 is used to effect connection between the adjacent sidewalls 11A and 11B. The sidewalls 11A and 11B are each designed in a given length from the standpoint of rationality in transportation and installation. A plurality of such sidewalls 11A, - - - are arranged in the extending direction of the guideway 10, thereby constructing the guideway 10.

Since the sidewalls 11A and 11B such as long shaped members cannot ignore deformation due to changes in temperature, the sidewalls 11A and 11B are arranged adjacent to each other, while a gap is ensured between them.

Connection holes 11e, 11e are formed respectively in the reinforcing ribs 11d, 11d provided at opposed end faces of the sidewalls 11A and 11B thus arranged, and a hole passing the ribs in the extending direction is formed by overlapping the connection holes 11e, 11e. The connection holes 11e, 11e have a diameter of about 10 to about 15 cm, for example.

Figure 7A:
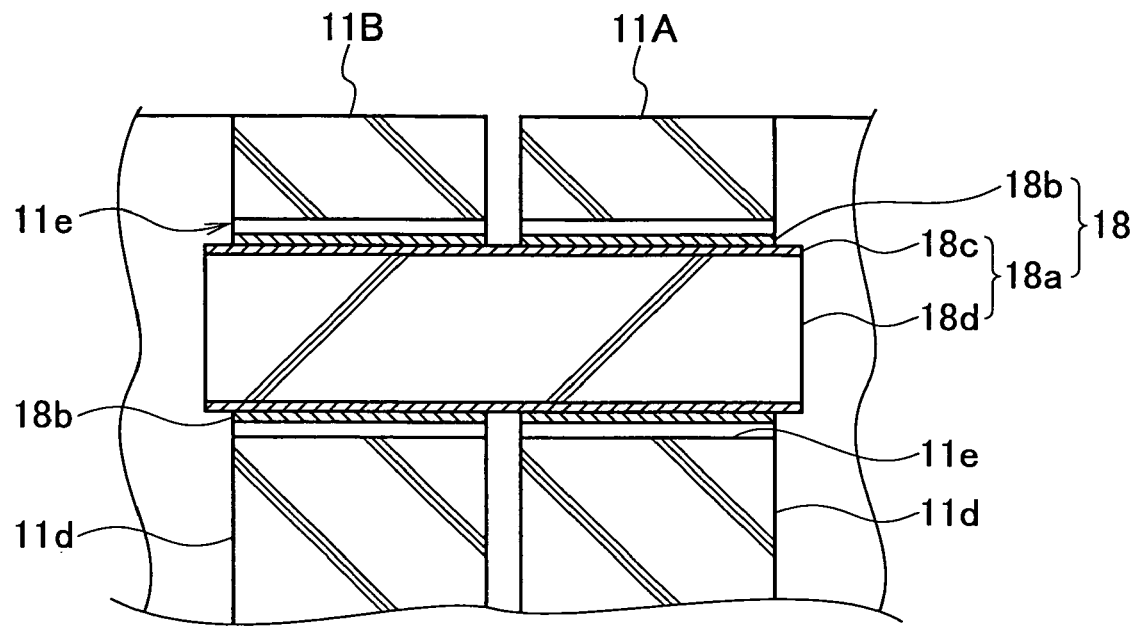
FIG. 7 is a schematic view of illustrating a method for constructing the connecting portion between the sidewalls as viewed in section along an A-A line of FIG. 6.

As shown in FIG. 7(a), a connecting member 18 is inserted through the penetrating connecting holes 11e and 11e. The connecting member 18 is positionally arrayed such that two outer tubes 18b and 18b may be arranged in the respective connecting holes 11e and 11e.

Figure 7B:
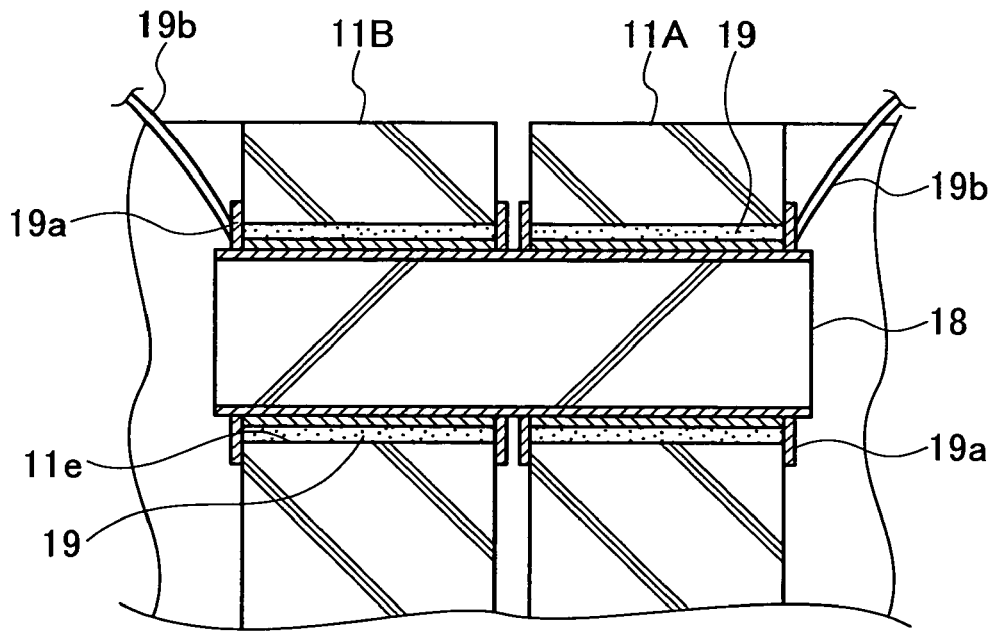

Opposite ends of the connecting holes 11e and 11e are closed with molding frames 19a, - - - by bringing a direction in which the sidewalls 11A and 11B extend or shrinks due to changes in temperature almost in conformity with a direction in which a central shaft portion 18a of the connecting member 18 slides inside the outer tubes 18b, 18b (See FIG. 7(b)).

Further, a joining material 19 is poured into the gap defined between the outer tubes 18b, 18b and the connecting holes 11e, 11e and closed by the molding frames 19a through pouring tubes 19b, 19b connected to the molding frames 19a, 19a.

As the joining material 19, non-shrinkable cement-based mortar into which an expanding agent or curing accelerator is mixed, or the like may be used.

As mentioned above, the connecting member 18 is inserted through the connecting holes 11e, 11e formed slightly larger, and the sliding direction and the extending direction of the connecting member 18 (that is, the directions in which the sidewalls 11 expand or shrink) has only to be matched with each other by positionally aligning them. Consequently, the connecting portion can be easily formed.

Figure 8:
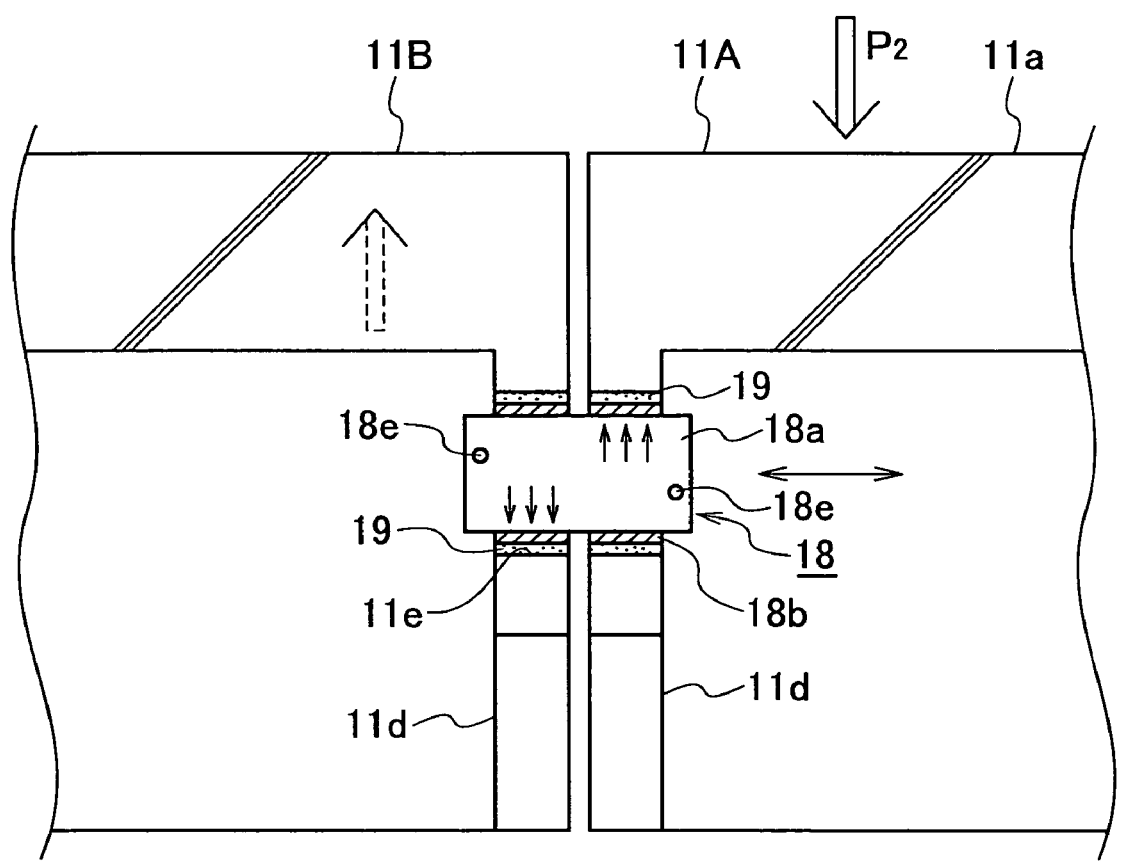
FIG. 8 is a sectional view of the connecting portion between the sidewalls as viewed from a plane.
Figure 9:
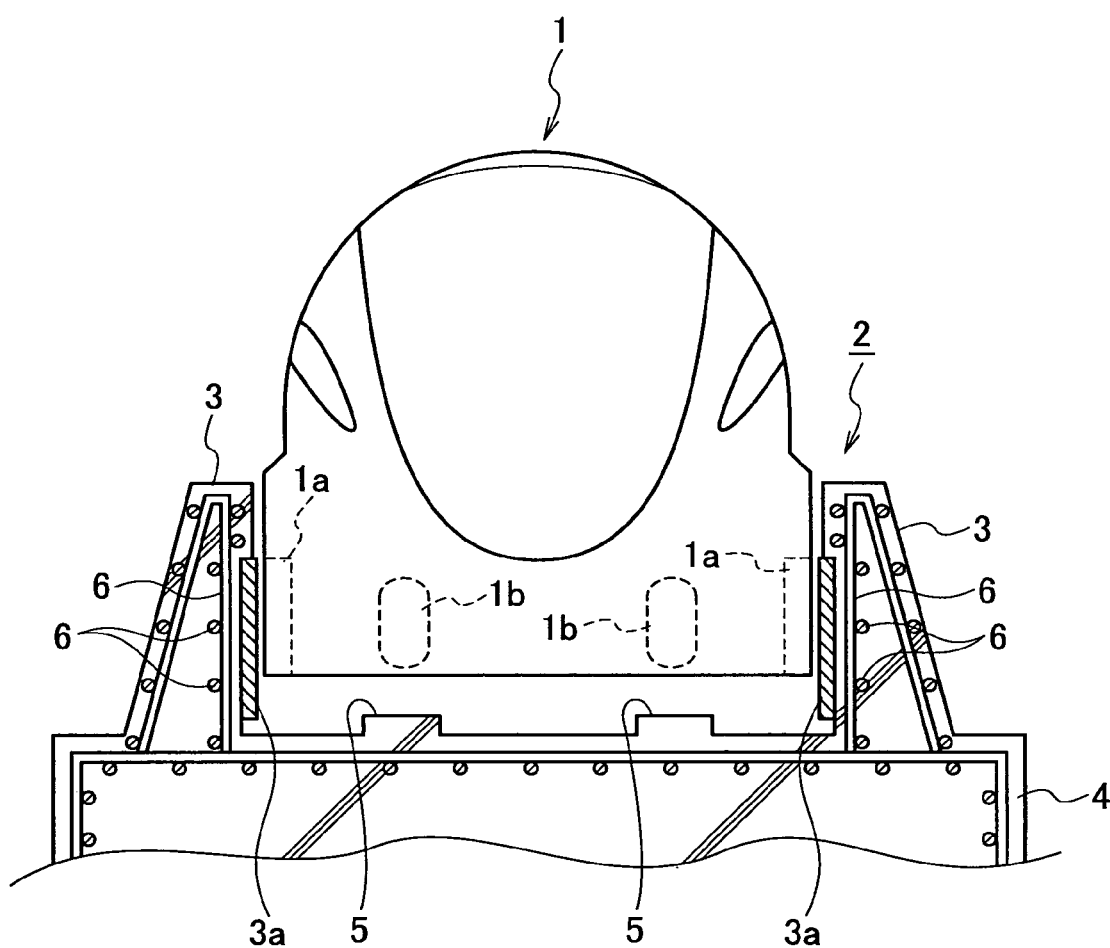
FIG. 9 is a sectional view of the conventional guideway in which the superconducting Maglev runs.

As shown in FIG. 8, the connecting member 18 can prevent the central shaft portion 18a from the outer tubes 18b, 18b by projecting peeling-preventing pins 18e, 18e in a direction orthogonal to the central shaft portion near its opposite ends as viewed in the axial direction.

In addition, as shown in FIG. 8, even if the horizontal load P2 acts upon the beam portion of only one of the sidewall 11A for emergent situation, the load can be transmitted to the adjacent sidewall 11B via the connecting member 18.

Therefore, sectional rigidity equivalent to that in the central portion can be ensured even at the end portions of the sidewalls 11A, 11B, so that continuity between the sidewalls 11A and 11B can be maintained.

Further, even if the sidewalls 11A, 11B expand with rises in temperature, temperature stress will not concentrate upon the connecting portion. Consequently, restraint stress due to temperature changes can be avoided, while the continuity is maintained.

As explained above, according to the present embodiment, since no reinforcing steel bars are used in the sidewall 11 at all, the structure can be obtained with no magnetism or very small magnetic permeability.

Thus, although the sidewall 11 is desired to have small magnetic permeability, the magnetic permeability of the present sidewall 11 can be reduced. Consequently, the power consumption required for running the superconducting Maglev 1 can be decreased.

Furthermore, since expensive reinforcing steel bars unlike the non-magnetic reinforcement needs not be used, the invention is economical.

Since no steel bar reinforcement is used, it is no need to control cover concrete thickness, and there is no fear that the sidewall 11 is deteriorated with rust of the steel bar reinforcement.

When prestressing force is introduced by means of the non-metallic prestressing member 13 or non-magnetic metallic member, cracking resistance or ultimate limit state loading can be enhanced. Even when the non-magnetic prestressing metallic member is used, the magnetic resistance will not be increased when the superconducting Maglev 1 runs, since the prestressing member is arranged in a deeper portion of the sidewall 11, that is, at a position farther from the inner surface thereof as compared with the case with the steel bar reinforcement.

Moreover, since the thickness of the member can be made extremely thin, its weight can be reduced to not more than a half of the guideway made of the ordinary reinforced concrete guideway. Thus, when the guideway 10 is provided on a bridge, the size of bridge piers, fundamental structures of footing, piles, etc. can be reduced, and the total construction cost can be largely reduced.

Since rigidity of the sidewall 11 is increased by using the above fiber-reinforced cement-based mixed material and reinforcing the sidewall with the reinforcing rib portions 11d, the intrinsic cycle of the sidewall 11 becomes ½ to ⅓ of that of the conventional reinforced concrete sidewall. Consequently, occurrence of vibration during running the superconducting Maglev 1 can be suppressed.

Further, since the rigidity is high, deformation is small against the load. Thus, the superconducting Maglev 1 can be stably run.

Since the above fiber-reinforced cement-based mixed material has good fresh property, the sidewall 11 having a complicated structure can be produced at a high precision without using a vibrator. Thus, it is no need to use an expensive molding frame having such high rigidity as being less susceptible to vibration which molding frame would be required to produce the reinforced concrete structure with high precision by using the vibrator. Therefore, the invention is economical.

Since the positional adjustment can be effected by means of the position-adjusting mat 16, the sidewall which is required to be positionally controlled at a high precision of 1 mm order can be easily installed.

The side walls 11, - - - are installed while a gap is provided between them, and connection is realized between the sidewalls 11 by using the connecting members 18 slidable in the axial direction. Thus, the connecting portions which can cope with deformation due to temperatures, while maintaining dynamic continuity, can be easily constructed.

Further, when a part of the sidewall 11 is damaged or when the ground coil 12 is exchanged, the sidewall in concern can be easily separated from the adjacent ones by removing the connecting member 18. Furthermore, since the sidewall 11 can be disconnected from the floor slab 14 by loosing the non-magnetic bolts 15a, the sidewall 11 can be easily exchanged.

The best mode of the present invention has been explained with reference to the drawings. Concrete constructions are not limited to this embodiment, and design changes will be included in the present invention so long as they do not depart from the gist of the present invention.

For example, according to the above embodiment, the non-metallic prestressing members 13 (or non-magnetic metallic prestressing members) are arranged in the beam portion 11a and the support base seat 11c. However, such members need not be necessarily used. The prestressing member may be arranged in the beam portion 11a only.

The way of fixing the sidewall 11 to the floor slab 14 is not limited to the non-magnetic bolts 15a. For example, it may be that lower ends of the non-metallic prestressing members are fixed inside the floor slab, and the upper ends are fixed to the upper face 11c of the support base seat 11c.

Further, the pouring of the filler 17 into the position-adjusting mat 16 under pressure may be performed with a pouring pump.

What is claimed is:

1. A sidewall for a guideway, said sidewall for the guideway being attached with a ground coil for levitation, guidance and propulsion of a superconducting Maglev, said sidewall being constructed by using a fiber-reinforced cement-based mixed material, said fiber-reinforced cement-based mixed material being produced by mixing non-metallic fibers or non-magnetic metal fibers into a cement-based matrix in a mixing amount of 1 to 4% for an entire volume of the cement-based matrix, said cement-based matrix being obtained by mixing a composition with water, said composition comprising cement, aggregate grains having a maximum grain diameter of not more than 2.5 mm, pozzolana-based reaction particles having particle diameters of not more than 15 μm and a dispersant, said fiber-reinforced cement-based mixed material having mechanical properties: a compression strength of not less than 150 N/mm$^2$ and a tensile strength of not less than a 5N/mm$^2$, said sidewall for the guideway comprising a connecting hole formed at an end face thereof and extending in an extending direction of the sidewall, and a connecting member, said connecting member comprising a central shaft portion and an outer tube made of a non-magnetic metal and slidably fitted around the central shaft portion, said connecting pipe being inserted into the connecting hole, while the exterior pipe is fixed to the connecting hole, and said sidewall for the guideway comprising a beam portion formed in the extending direction of the guideway, a plane-shaped support base seat vertically spaced downwardly from the beam portion, a wall portion to which the ground coil is to be attached and which connects the beam portion and the support base seat, and reinforcing ribs which connect a back face of the wall portion and an upper face of the support base seat and are arranged at an interval in the extending direction.

2. The sidewall for the guideway set forth in claim 1, wherein prestressing force is introduced by a non-metallic prestressing cable or a non-magnetic metallic member passed through the structure.

3. The sidewall for the guideway set forth in claim 1, which further comprises a support base seat and a position-adjusting bag arranged at the support base seat at a position opposed to a floor slab on which the support base seat is to be placed, said position-adjusting bag being to be filled with a viscoelastic material.

4. The sidewall for the guideway set forth in claim 2, which further comprises a support base seat and a position-adjusting bag arranged at the support base seat at a position opposed to a floor slab on which the support base seat is to be placed, said position-adjusting bag being to be filled with a viscoelastic material.

5. The sidewall for the guideway set forth in claim 1, which further comprises a reinforcing rib at an end portion of the sidewall in the extending direction of the sidewall, said reinforcing rib being formed with said connecting hole.

6. The sidewall for the guideway set forth in claim 2, which further comprises a reinforcing rib at an end portion of the sidewall in the extending direction of the sidewall, said reinforcing rib being formed with said connecting hole.

7. A method for installing the sidewall for the guideway set forth in claim 1 on a floor slab, said method comprising placing a position-adjusting bag on a floor slab, said position-adjusting bag being adapted to be filled and expanded with a viscoelastic material, placing a support base seat of the sidewall for the guideway on the position-adjusting bag, adjusting the position of the sidewall by pouring the viscoelastic material into the position-adjusting bag under pressure, and fixing the support base seat onto the floor slab after the viscoelastic material is cured.

8. A method for installing sidewalls for guideway in claim 5, wherein when sidewalls are to be connected in the extending direction of the guideway, while a gap is ensured between the adjacent sidewalls, said method comprising inserting said connecting member into the connecting holes of the reinforcing ribs arranged at the end portions of the sidewalls, respectively, while two outer tubes made of the non-magnetic material are slidably fitted along the central shaft portion, bringing the slidable direction substantially in conformity with said extending direction, filling a joining agent between the outer tubes and the connecting holes, and fixing the outer tubes to the connecting holes, respectively.

9. The method for installing the sidewall for the guideway in claim 8, which further comprises placing a position-adjusting bag on a floor slab, said position-adjusting bag being adapted to be filled and expanded with a viscoelastic material, placing a support base seat of the sidewall for the guideway on the position-adjusting bag, adjusting the position of the sidewall by pouring the viscoelastic material into the position-adjusting bag under pressure, and fixing the support base seat onto the floor slab after the viscoelastic material is cured.

* * * * *